(12) United States Patent
Dwekat et al.

(10) Patent No.: US 7,660,402 B1
(45) Date of Patent: Feb. 9, 2010

(54) SYSTEM AND METHOD FOR MANAGING TELECOMMUNICATION TRUNK GROUPS

(75) Inventors: Zyad Ahmad Dwekat, Raleigh, NC (US); Jeffrey M. Fries, Wake Forest, NC (US); Farooq Ijaz Cheema, Raleigh, NC (US); John Lowe, Garner, NC (US)

(73) Assignee: Embarq Holdings Company, LLC, Overland Park, KS (US)

( * ) Notice: Subject to any disclaimer, the term of this patent is extended or adjusted under 35 U.S.C. 154(b) by 1166 days.

(21) Appl. No.: 10/715,781

(22) Filed: Nov. 18, 2003

(51) Int. Cl.
*H04M 15/00* (2006.01)
(52) U.S. Cl. .................. 379/114.08; 379/137
(58) Field of Classification Search ........... 379/114.08, 379/137
See application file for complete search history.

(56) References Cited

U.S. PATENT DOCUMENTS

| | | | |
|---|---|---|---|
| 4,456,788 A * | 6/1984 | Kline et al. ................. | 379/137 |
| 4,669,113 A * | 5/1987 | Ash et al. ............... | 379/221.01 |
| 4,756,019 A * | 7/1988 | Szybicki ............... | 379/114.08 |
| 5,054,096 A | 10/1991 | Beizer | |
| 5,526,408 A | 6/1996 | Yekutiely | |
| 5,844,823 A | 12/1998 | Mishra | |
| 5,884,284 A | 3/1999 | Peters et al. | |
| 5,999,932 A | 12/1999 | Paul | |
| 6,028,924 A | 2/2000 | Ram et al. | |
| 6,104,798 A | 8/2000 | Lickiss et al. | |
| 6,122,632 A | 9/2000 | Botts et al. | |
| 6,219,648 B1 | 4/2001 | Jones et al. | |
| 6,226,286 B1 | 5/2001 | Danne et al. | |
| 6,285,748 B1 * | 9/2001 | Lewis .................... | 379/112.01 |
| 6,349,238 B1 | 2/2002 | Gabbita et al. | |
| 6,385,609 B1 | 5/2002 | Barshefsky et al. | |
| 6,389,126 B1 | 5/2002 | Bjornberg et al. | |
| 6,724,876 B2 | 4/2004 | Williams et al. | |
| 6,865,268 B1 | 3/2005 | Matthews et al. | |
| 6,937,701 B1 | 8/2005 | Gold | |
| 7,142,655 B2 | 11/2006 | Malinowski et al. | |
| 7,221,912 B2 | 5/2007 | Nelson et al. | |
| 7,289,605 B1 | 10/2007 | Jean et al. | |
| 7,308,094 B1 | 12/2007 | Jean et al. | |
| 2002/0111842 A1 | 8/2002 | Miles | |

(Continued)

FOREIGN PATENT DOCUMENTS

EP 1 235 415 A2 2/1998

OTHER PUBLICATIONS

Final Office Action date mailed Nov. 28, 2008 for U.S. Appl. No. 10/610,191.

(Continued)

*Primary Examiner*—Rasha S Al Aubaidi
(74) *Attorney, Agent, or Firm*—Sonnenschein Nath & Rosenthal LLP (57) ABSTRACT

The present invention provides a system and method for managing telecommunication trunk groups. Configuration, operational, and other information may be maintained regarding trunk groups in a telecommunication network. Various calculations and searches may be performed using the information maintained regarding the trunk groups of telecommunication network and provided to a user to allow a user to identify the performance of various trunk groups. The present invention may further allow a user to propose changes to the configuration or routing associated with one or more trunk groups and provide a user with predicted outcomes should such changes be made.

30 Claims, 7 Drawing Sheets

U.S. PATENT DOCUMENTS

2004/0267586 A1    12/2004    McDougal et al.

OTHER PUBLICATIONS

RCE/Response filed Jan. 23, 2009 to Final Office Action date mailed Nov. 26, 2008 for U.S. Appl. No. 10/610,191.

Final Office Action date mailed Nov. 28, 2008 for U.S. Appl. No. 10/610,208.

Response filed Dec. 29, 2008 to Final Office Action date mailed Nov. 28, 2008 for U.S. Appl. No. 10/610,208.

Advisory Action date mailed Jan. 28, 2009 for U.S. Appl. No. 10/610,208.

Final Office Action date mailed Dec. 24, 2008 for U.S. Appl. No. 10/610,118.

Non-Final Office Action dated Jan. 8, 2008 for U.S. Appl. No. 10/610,191.

Response filed Apr. 8, 2008 to Non-Final Office Action dated Jan. 8, 2008 for U.S. Appl. No. 10/610,191.

Notice of Non-Compliant Amendment dated Aug. 11, 2008 for U.S. Appl. No. 10/610,191.

Response filed Sep. 3, 2008 to Notice of Non-Compliant Amendment dated Aug. 11, 2008 for U.S. Appl. No. 10/610,191.

Non-Final Office Action dated Jul. 9, 2007 for U.S. Appl. No. 10/610,208.

Response filed Nov. 9, 2007 to Non-Final Office Action dated Jul. 9, 2007 for U.S. Appl. No. 10/610,208.

Final Office Action dated Feb. 7, 2008 for U.S. Appl. No. 10/610,208.

Response filed May 7, 2008 to Final Office Action dated Feb. 7, 2008 for U.S. Appl. No. 10/610,208.

Non-Final Office Action dated Jun. 12, 2008 for U.S. Appl. No. 10/610,208.

Response filed Jul. 18, 2008 to Non-Final Office Action dated Jun. 12, 2008 for U.S. Appl. No. 10/610,208.

Non-Final Office Action dated Dec. 20, 2007 for U.S. Appl. No. 10/610,118.

Response filed Mar. 18, 2008 to Non-Final Office Action dated Dec. 20, 2007 for U.S. Appl. No. 10/610,118.

Non-Final Office Action dated Jul. 28, 2008 for U.S. Appl. No. 10/610,118.

Response filed Oct. 16, 2008 to Non-Final Office Action dated Jul. 28, 2008 for U.S. Appl. No. 10/610,118.

"Pulsar's WavPort Voice-Activated Services", http://www.lynuxworks.com/solutions/telecom/inaction/pulsar.php3, 3 pages.

* cited by examiner

| TRUNK GROUP CONFIGURATION INFORMATION 112 | NETWORK TRAFFIC INFORMATION 114 | USER GROUP DEFINITIONS 116 |
|---|---|---|

↑ 110

| TRUNK GROUP UTILIZATION CALCULATOR 123 | TRUNK GROUP GRADE OF SERVICE CALCULATOR 125 | TRUNK GROUP CHANGE EFFECT CALCULATOR 127 | TRUNK GROUP SELECTION CRITERIA SEARCH ENGINE 129 |
|---|---|---|---|

↑ 120

| TRUNK GROUP DISPLAY 131 | TRUNK GROUP SELECTION 132 | SELECTED TRUNK GROUP INFORMATION DISPLAY 133 | TRUNK GROUP UTILIZATION DISPLAY 134 | GRADE OF SERVICE DISPLAY 135 | GRADE OF SERVICE SELECTION 136 | TRUNK GROUP SIZING CALCULATOR 137 | PREDICTED UTILIZATION DISPLAY 138 | PREDICTED GRADE OF SERVICE DISPLAY 139 |
|---|---|---|---|---|---|---|---|---|

SYSTEM AND METHOD FOR MANAGING TELECOMMUNICATION TRUNK GROUPS

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention relates to managing telecommunication resources. More particularly, the present invention relates to a system and method for managing trunk groups used in telecommunication networks.

BACKGROUND OF THE INVENTION

Managing a telecommunication network is a challenging task. A telecommunication network comprises a large plurality of connection media and hardware. Managing the routing, load, utilization, and performance of a large plurality of connections and hardware of varying types can greatly strain the resources of a telecommunication service provider. One particular area of telecommunication network management that present a challenge is the management of trunk groups. As used herein, a trunk is a circuit based connection used to connect a telephony call between switching stations when the endpoints of a call are located in different local exchanges, and a trunk group may comprise connection media and the associated hardware over which multiple trunks are established. Managing the routing, loads, and performance of trunk groups in a telecommunication network requires the processing, analysis, and manipulation of large volumes of data. The present invention provides a system and method for managing such trunk groups.

BRIEF SUMMARY OF THE INVENTION

The present invention, which may be implemented using computer software, provides a system and method for managing the configuration, utilization, and grade of service of telecommunication trunk groups. Systems and methods in accordance with the present invention may be used to maintain information regarding trunk groups in a telecommunication network, including traffic volume, network configuration, and groupings of trunk groups. Systems and methods in accordance with the present invention may also provide information regarding available trunk groups, the utilization of trunk groups, and grade of service of trunk groups, as well as receiving proposed changes to trunk group configuration and operational parameters. Systems and methods in accordance with the present invention may further calculate predicted trunk group performance likely to result if specified changes are made to trunk group configuration and other parameters.

BRIEF DESCRIPTION OF THE SEVERAL VIEWS OF THE DRAWING

The present invention is described in detail below with reference to the attached drawing figures, wherein:

FIG. 6 illustrates a screen shot of exemplary software implementing the present invention; and FIG. 7 illustrates a screen shot of exemplary software implementing the present invention.

DETAILED DESCRIPTION OF THE INVENTION

Modern telecommunication networks involve a large number of connection media, along with a large number of connection hardware, such as switches and routers. Circuit based telecommunication connections are formed using the connection media and the associated hardware. Manage the large amount of connection media and hardware in a telecommunication network presents numerous challenges.

Telecommunication service providers strive, of course, to maintain their networks in working order at all times so as to provide telecommunication connectivity, but the demands of telecommunication resource management extend well beyond merely maintaining a functioning network. Telecommunication service providers must further operate their networks as efficiently as possible to keep costs low for telecommunication customers and to maintain an acceptable profit margin for the telecommunication service provider. At the same time costs are kept low, telecommunication service providers must provide acceptable service to their customers. Maintaining this balance between efficiency and acceptable service requires a delicate balancing act by telecommunication service providers. In general, it is inefficient to utilize connection media and associated hardware at a utilization percentage well below the capacity of the media and hardware. As utilization approaches one hundred percent, however, the service provided to customers may decline. Grade of service may be a metric describing network service by measuring criteria such as dropped connections, latency or other criteria. Accordingly, an acceptable compromise between utilization and grade of service must be reached. To identify the optimal balance between utilization and grade of service, however, requires the collection, maintenance, and analysis of the traffic of the telecommunication network.

One particular area where efficient utilization and quality of service must be balanced involves the management of telecommunication trunk groups. Trunks may utilize a variety of different connection media, with twenty-four trunks often being aggregated in units referred to in the art as T-1s. Often, trunks are managed by placing them in groupings referred to as trunk groups. A trunk group may represent a plurality of trunks used in forming connections between particular groups of end points, such as particular local calling exchanges, or switches. A trunk group may be a T-1 comprising twenty-four trunks, although such a grouping is not necessary in accordance with the present invention. There is no requirement that trunk groups comprise twenty-four trunks, or any other number of trunks. Trunk groups may be further grouped into larger groups, and organized in a hierarchical fashion as is convenient for network management purposes. It should be noted that some in the art refer to a single media, as a trunk and refer to a set of media as a trunk group. While this alternative nomenclature is not used herein, it should be appreciated that the present invention may be used with telecommunication networks using such alternative nomenclature.

The present invention provides a system and method for managing trunk groups to achieve an appropriate and effective balance between efficiency and quality service. A system and method in accordance with the present invention may utilize computer software to collect and maintain trunk group information, to display that information to users, to receive user input proposing changes to trunk group settings and configurations, and to calculate information relating to predicted trunk group performance either before or after proposed modifications.

Figure 1:
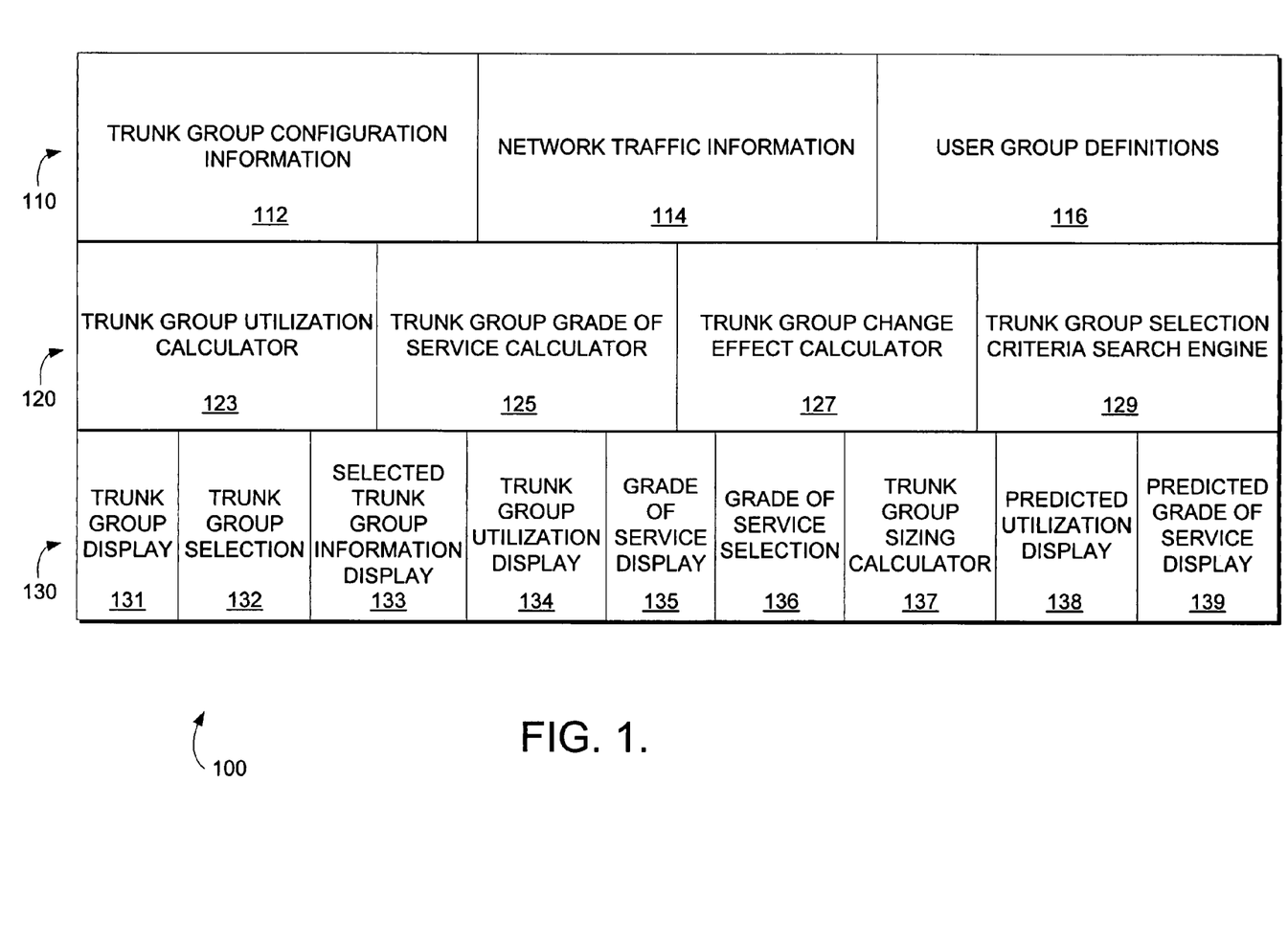
FIG. 1 schematically illustrates a system and method in accordance with the present invention.

Referring now to FIG. 1, a system and method in accordance with the present invention as illustrated schematically. System 100 comprises three layers. Data layer 110 may comprise trunk group configuration information 112, network traffic information 114, and user group definitions 116. Other information relevant to trunk group configuration, performance, operation, maintenance, or history may likewise be included in data layer 110. The data layer 110 may be maintained in one or more databases in any format. Trunk group configuration information 112 may comprise information such as the end points for a particular trunk or trunk group, the equipment associated with particular trunks and trunk groups, the capacity of particular trunks and trunk groups, and any other information deemed pertinent to trunk group configuration.

Network traffic information 114 may comprise information regarding the total volume of traffic transmitted over particular equipment associated with a trunk group, or transmitted over a connection within a trunk group. A variety of protocols exist for measuring network traffic on equipment or connections, any of which may be used with the present invention. Additionally, future developed methods for collecting network utilization information may be used in accordance with the present invention.

User group definitions 116 may, for example, comprise the particular trunks within a given trunk group. User group definitions 116 may further comprise larger hierarchical groupings of trunks and trunk groups. User group definitions 116 may be particularly useful to group trunk groups in accordance with which individuals or group of individuals within a telecommunication service provider is responsible for the management of those trunk groups the functionalities of the trunk groups, or the importance of trunk groups in the telecommunication network. A calculation layer 120 performs calculations using data contained in data layer 110 and inputs or other selections made by a user, examples of which are described further below.

Calculation layer 120 may include trunk group utilization calculator 123. Trunk group utilization calculator 123 may calculate the capacity utilization of the trunk group, or other grouping of trunks, using the trunk group configuration information 112 and the network traffic information 114 to determine the capacity at which a particular trunk group is utilized. This capacity may be appropriately expressed as a percentage of available capacity, although other units, such as available centum call seconds, may be used as well.

Trunk group grade of service calculator 125 may utilize trunk group configuration information 112 and the grade of service required for the trunk group to calculate how much traffic the trunk group can carry. Trunk group grade of service calculator 125 may also use the statistical history of traffic on a given trunk group to calculate the utilization of the trunk group. Trunk group grade of service calculator 125 may further utilize network traffic information 114 and a user selected grade of service to determine the number of trunks required for a particular trunk group to perform at the user selected grade of service. Grade of service may be expressed in a variety of ways, such as the number of calls likely to be dropped or blocked out of a given total, such as one thousand total calls. Trunk group grade of service calculator 125 may also optionally predict, based upon network traffic information 114 and user input selecting a size for a trunk group, the grade of service likely to be obtained for that trunk group configuration.

Trunk group sizing calculator 127 uses the current size of a trunk group, the required grade of service, and the predicted traffic (which may often be based on historical traffic data) to calculate the size required for the trunk group to provide the required grade of service. Trunk group sizing calculator 127 may indicate to increase or decrease the size of the trunk group.

Trunk group selection criteria search engine 129 may be utilized to identify trunk groups meeting user defined criteria by searching the trunk group configuration information 112, the network traffic information 114, and/or the user group definitions 116. The use of the trunk group selection criteria search engine 129 will identify all trunks within the trunk groups identified by the user. Trunk group selection criteria search engine 129 may also function in conjunction with other components of the calculation layer 120. For example, a user may wish to identify all trunk groups with a percentage utilization above or below a certain threshold, all trunk groups that serve a particular NPA or NXX code, all trunk groups associated with given switches, or other criteria. Trunk group selection criteria search engine 129 may then utilize the trunk group configuration information 112, the network traffic information 114, and the trunk group utilization calculator 123 to identify the trunk groups that meet the selection criteria.

User interaction layer 130 provides a variety of ways for a user to obtain information regarding trunk group configuration and performance and to propose changes to trunk group configuration and operational criteria. User interface layer 130 may include a trunk group display 131. Trunk group display 131 may graphically display trunk groups included in the network or a portion of the network, as well as topological and other information relating to those trunk groups.

Trunk group selection component 132 may work in conjunction with trunk group display 131 to allow a user to select one or more trunk groups for further processing in accordance with the present invention. For example, a graphical user interface may be used to display available trunk groups in a list or other format. The user may then select one or more trunk groups using a selection mechanism, such as a user positionable cursor or the input of identification codes.

The selected trunk group information display component 133 provides information regarding one or more trunk groups selected using trunk group selection component 132. The selected trunk group information display component 133 may provide a user with information such as trunk group configuration, trunk group utilization, or other information received from data layer 110 or calculation layer 120.

Trunk group utilization display 134 provides further details to a user regarding the utilization of the selected trunk group. Utilization may be displayed to a user as a percentage of available capacity, as an absolute number such as centum call seconds, or in any other fashion.

Grade of service display 135 may provide a user with information regarding the size necessary for a trunk group to provide a given grade of service based upon historical utilization data for the selected trunk group. Grade of service display may optionally be used to predict a grade of service after proposed changes to trunk group size based upon historical utilization data. It should be recalled that grade of service may be defined in a variety of ways.

Grade of service selection component 136 allows a user to select the grade of service desired for the selected trunk group. Grade of service selection component 136 may provide a user with a predefined set of choices or may allow a user to input any desired choice. Grade of service may be defined in a variety of ways.

Trunk group change proposals component 137 receives change proposals from a user. A change proposal may involve a user designed modification to a trunk group or routing involving a trunk group. For example, a user may be interested in adding or deleting trunks from a trunk group or in rerouting traffic to or from a trunk group.

Predicted utilization display component 138 displays the utilization predicted for a trunk group using configuration information from trunk group change component 137 and predicted traffic (often based upon historical traffic data). Predicted grade of service display 139 provides information regarding the grade of service predicted if trunk group changes proposed using trunk group change proposals component 137 are implemented.

The multi-layered system and method illustrated in FIG. 1 may be implemented using computer software. Any programming language and format may be used to create such software. It may, in some instances, be desirable to implement such software in a web-based environment, although such implementation is not necessary to the practice of the present invention. The remaining FIGS. illustrate the operation of a graphical user interface of exemplary software in accordance with the present invention.

Figure 2:
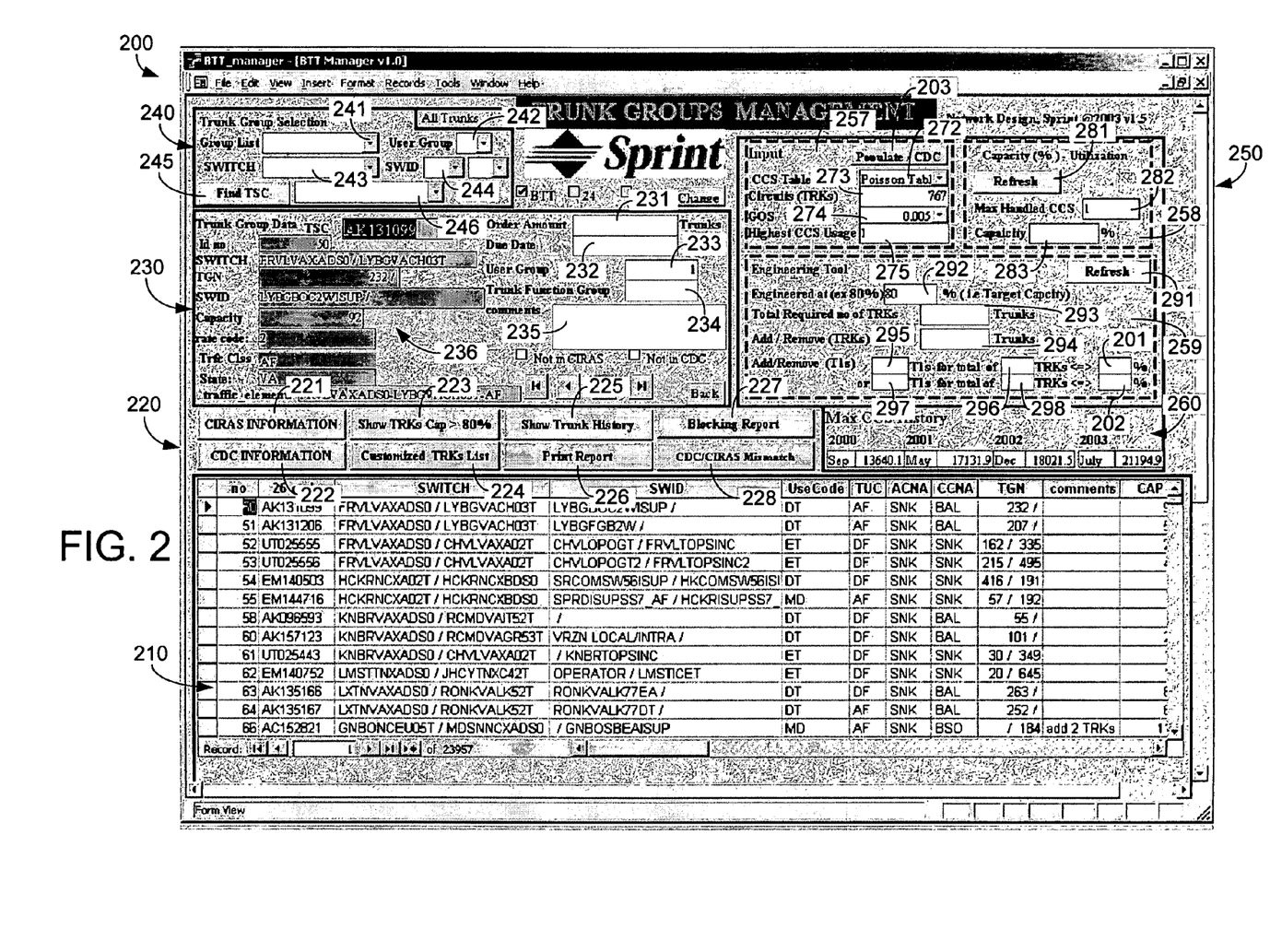
FIG. 2 illustrates a screen shot of exemplary software implementing the present invention.

Referring now to FIG. 2, a graphical user interface 200 of exemplary software implementing the present invention is illustrated. The graphical user interface 200 includes a trunk group display panel 210. Trunk group display panel 210 provides information to a user regarding available trunk groups. Trunk groups identified in the trunk group display panel 210 may be identified by a numeric references, the switches associated with the trunk group, other codes, and may include additional information regarding the topological or network performance of a given trunk group. A user may interact with trunk group display panel 210 by way of a user positionable cursor, for example to select a trunk group for further display and processing.

Command section 220 may include a variety of buttons that may be activated using a user positionable cursor to obtain particular trunk group information or to perform particular trunk group processing tasks. If included in software implementing the present invention, the buttons and the corresponding commands executed within command portion 220 may vary and may be adapted to a particular use of the present invention. As illustrated in FIG. 2, command portion 220 includes a CIRAS information button 221, a CDC information button 222, a show trunks group with capacity greater than eighty percent button 223, a customized trunk group list button 224, a show trunk group history button 225, a print report button 226, a blocking report button 227, and a CDC/CIRAS mismatch button 228. The CIRAS information button 221 may be used to obtain the CIRAS information for a particular selected trunk group. As used herein, CIRAS refers to a circuit administration system that provides an industry standard design process for access and non-access circuit provisioning facility, and trunk design. Of course, other systems may be used to replace or supplement CIRAS. The CDC information button 222 may be used to obtain CDC information regarding a particular selected trunk group. As used herein, CDC refers to a central data collection system that collects traffic data from telecommunication network switches and then loads the data into a central database for use by the telecommunication network operator for purposes such as network design or marketing. CDC data may take the form of operational measurements taken at predetermined intervals, such as an hour or a half hour. CDC data may be maintained in a variety of ways, such as on a mid-range data base. Of course, other systems may be used to replace or supplement CDC. It should be noted that the exemplary user interface 200 illustrated in FIG. 2 displays both CDC information and CIRAS information in a single interface 200, which may be particularly helpful to those responsible for managing trunk groups.

The show trunk group at capacity of greater than eighty percent button 223 allows the user to obtain a display of trunk groups at operating at greater than eighty percent of their capacity. Of course, other threshold utilizations may be used in implementing the present invention. The customized group list button 224 may be used to display for selection customized lists of trunk groups, for example those customized for particular personnel groups of administrative authority over those trunk groups, for display and selection. The show trunk group history button 225 may be used to display historical data regarding utilization in centum call seconds and percent utilization for the selected trunk group. The print report button 226 may be used to output to a printer a report of selected information. The blocking report button 227 may be used to list all trunk groups that blocked any call during the last measurement period, which may be a day, a week, a month, or any other time frame. The CDC/CIPAS mismatch button 228 may be used to obtain a list of trunk groups where information retrieved from the CDC does not correspond with information from the same trunk group obtained from the CIRAS.

Trunk group data display panel 230 displays information regarding a selected trunk group. A trunk group may be selected as described above using the trunk group display panel 210 and a user positionable cursor. A trunk group may also be selected by a user by inputting an identifier code, such as what is often referred to as a two-six code, corresponding to the desired trunk group in field 246. Alternatively, a trunk group may be selected by inputting identifying information in one or more of the fields of the trunk group data display panel 230. The trunk group data display panel 230 may comprise fields displaying or receiving information about a selected trunk group. For example, the trunk group data display panel 230 may include a rate code 236 related, for example, to the functionality type of a trunk. Other information, such as the capacity of a trunk group, equipment associated with a trunk group, the traffic class of the trunk group, or other information may be displayed. Fields may also display or receive information regarding orders pending to add or remove trunks to the trunk group 231, and the date for such orders 232, the user groups 233 for which that trunk group has been assigned for management purposes, information about a trunk group's function 234 and comments regarding the trunk group 235.

The trunk group selection panel 240 provides other means for a user to select one or more trunk groups. Trunk group selection panel 240 allows a user to select a trunk group based upon group lists 241, associated switches 243, defined user group 242, and switch identifications 244.

The performance display 250 allows a user to evaluate the performance of a trunk group, to propose changes to the trunk group, and to obtain predicted performance results if such changes are made. Performance display panel 250 may be separated into separate sub-panels performing different functions.

CDC sub-panel 257 acts as a calculation input panel. A user may select an engineering tool for use in making a CCS calculation using selection 272. For example, a user may select a Poisson table for use in calculating the performance and characteristics of a trunk group if given changes are made to the configuration of that trunk group. The size of the trunk group, given, for example, as the number of trunks associated with a trunk group may be input using selection 273. The grade of service desired for a trunk group may input using selection 274. The grade of service 274 may be stated in a variety of ways, as illustrated in FIG. 2. In the example illustrated in FIG. 2, the grade of service 274 is illustrated as a number of calls blocked per one thousand calls made. The highest CCS usage expected for a trunk group may be input using selection 275, which may be based upon historical utilization data. Alternatively, populated CDC button 203 may be used automatically use historical data for the number of trunks in a trunk group and the highest CCS usage. CCS refers to "call centum seconds."

Utilization sub-panel 258 may display the results of calculations based upon information input in sub-panel 257 by a user or using historical information. The maximum CCS handled by the trunk group may be displayed in 282. A calculated capacity may be displayed in 283. Capacity may be displayed as a percentage of total available capacity, although other units may be used as well. After changes to inputs have been made in sub-panel 257, new results may be calculated and displayed in sub-panel 258 when a user selects the refresh button 281.

Engineering tool sub-panel 259 may be used to perform engineering operations on a selected trunk group based upon information submitted by users or based upon historical information and the capacity at which a trunk group is targeted to operate as input using the engineered at textbox 292. The number of trunks required to obtain the desired grade of service input by a user at the targeted utilization is calculated at the predicted highest usage and may be displayed in the required trunk textbox 293. The number of trunks to be added or removed from a trunk group may be determined and shown in textbox 294. As described above, trunks are often grouped as T-1s, with twenty-four trunks in each T-1. Because of this, if calculations indicate that thirty-one additional circuits are necessary, it may be that two T-1s, for a total of forty-eight circuits, must be added. Box 295 and box 296 may show the number of T-1s to be added and the corresponding number of circuits for the first choice, and box 297 and box 298 may show the number of T-1s to be added and the corresponding number of circuits for the first choice, and box 297 and 298 may show the number of T-1s to be added and the corresponding number of circuits for the second choice. The calculated expected utilization for the first choice may be displayed in box 201, and the calculated expected utilization for the second choice may be displayed in box 202. A refresh button 291 may be used to perform the engineering calculations again if information input for the calculations are changed.

A history panel 260 may be used to display the maximum CCS usage obtained in preceding years, along with the numerical value of that usage and the month in which the maximum usage occurred.

Figure 3:
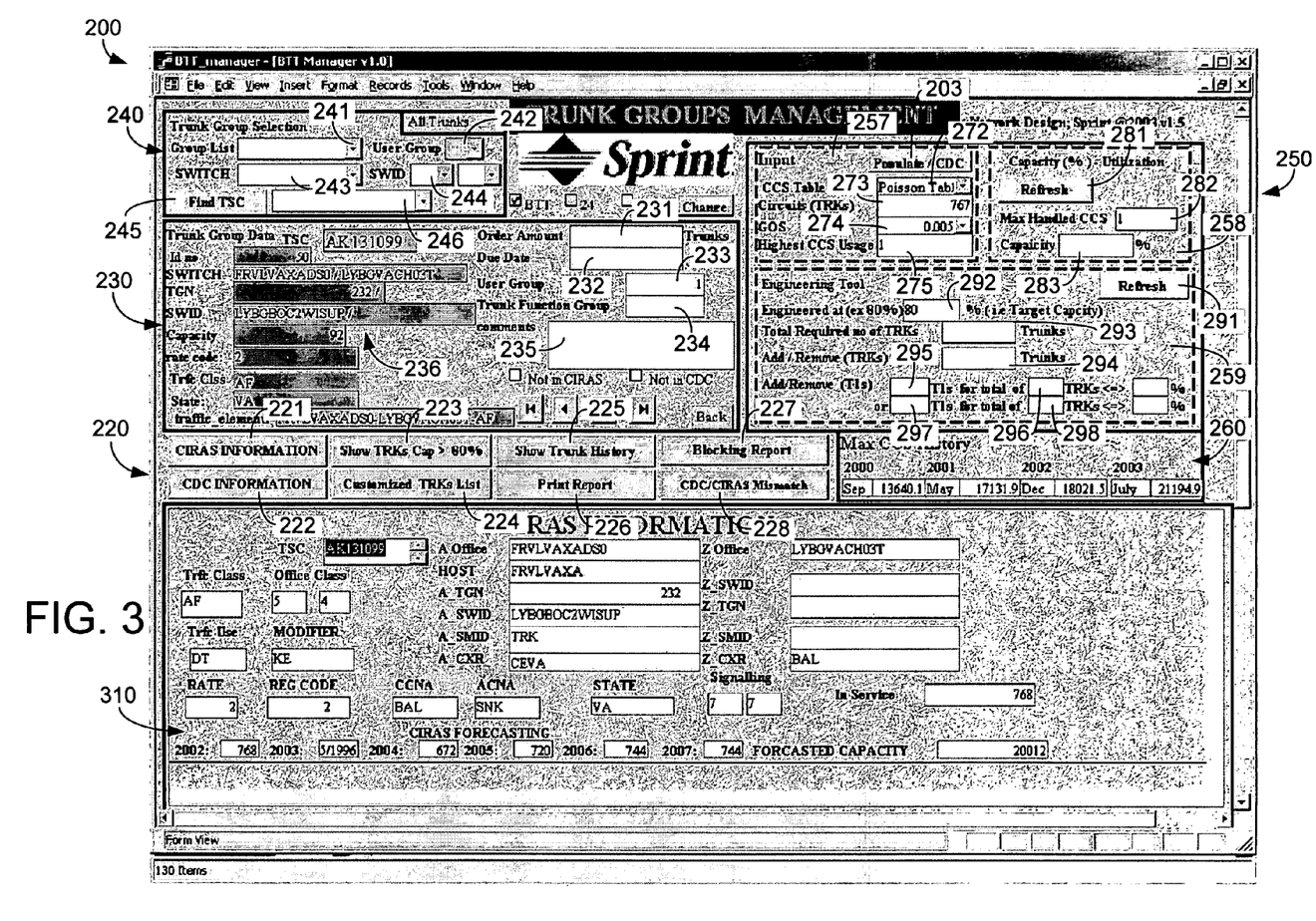
FIG. 3 illustrates a screen shot of exemplary software implementing the present invention.

Referring now to FIG. 3, a graphical user interface 200 of exemplary software in accordance with the present invention is illustrated after the CIRAS information button 221 has been selected. As a result, the trunk group display panel 210 has been replaced by a CIRAS information panel 310. The CIRAS information panel 310 displays routing information regarding the selected trunk group, such as descriptions of the traffic on that trunk group, the CIRAS forecasting for the trunk group in the future, the offices and switches associated with the trunk group, and geographical information relating to the trunk group.

Figure 4:
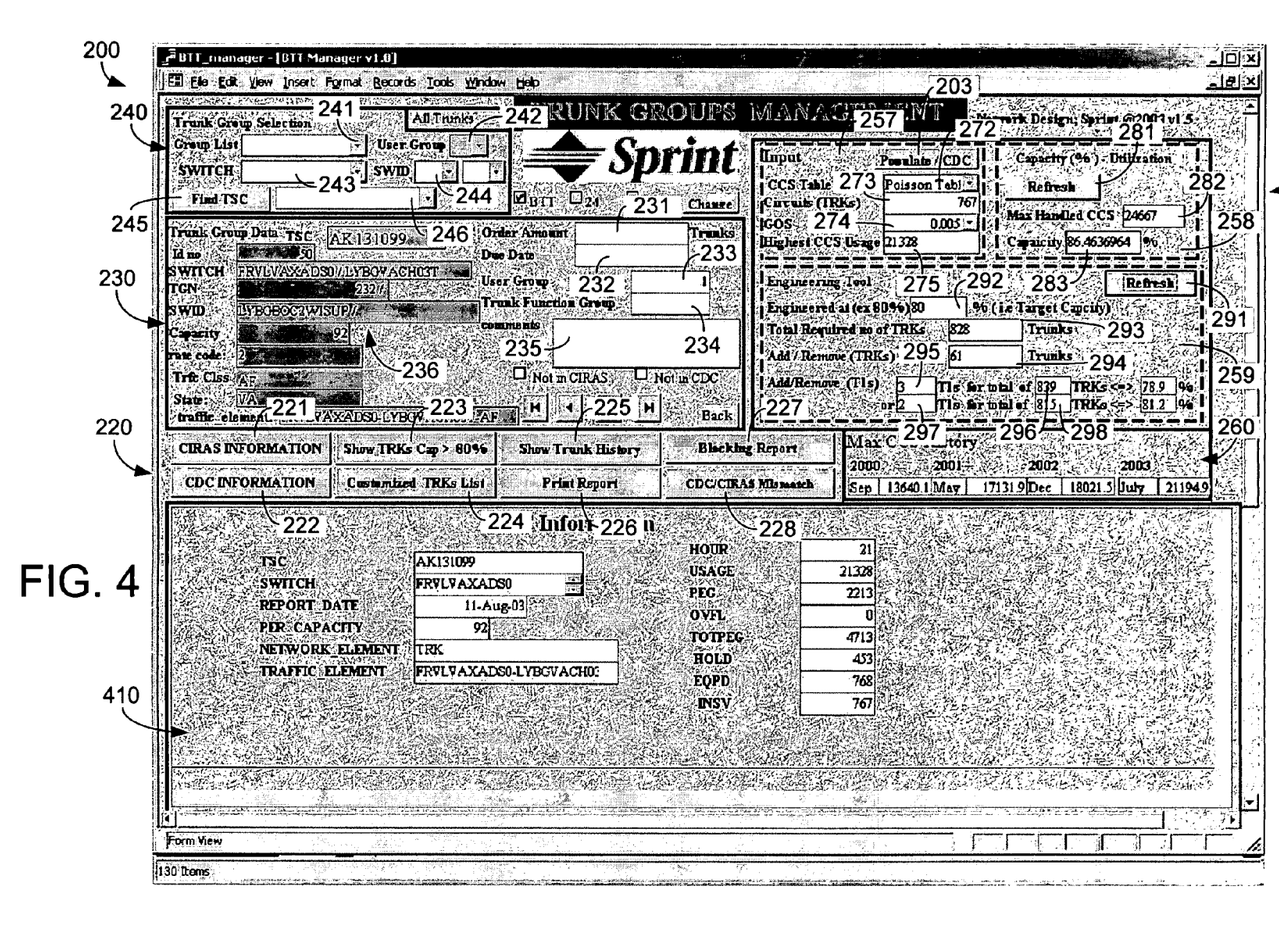
FIG. 4 illustrates a screen shot of exemplary software implementing the present invention.

Referring now to FIG. 4, the graphical user interface 200 of exemplary software in accordance with the present invention is illustrated after the CDC information button 222 has been selected. The trunk group panel 210 has now been replaced by a CDC information display panel 410. CDC information display panel 410 may display to a user information regarding the operation of a trunk group, the hardware associated with the trunk group, the network elements associated with the trunk group, the traffic elements associated with the trunk group, the capacity at which a trunk group is operating, and historical information regarding the selected trunk group.

Figure 5:
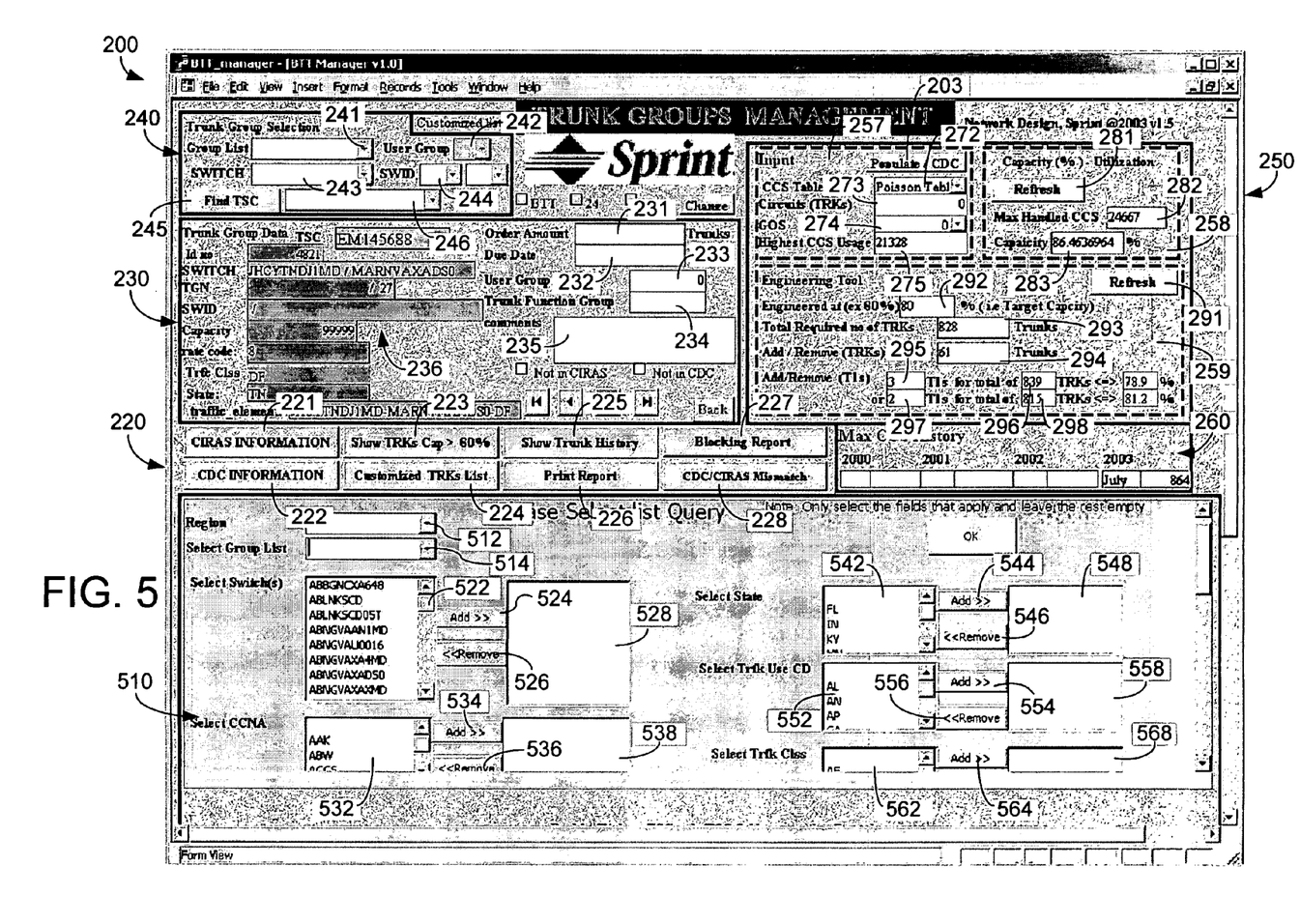
FIG. 5 illustrates a screen shot of exemplary software implementing the present invention.

Referring now to FIG. 5, the graphical user interface 200 of the exemplary software in accordance with present invention is illustrated after the customized trunk list button 224 has been selected. The trunk group panel 210 has now been replaced by a query panel 510. Query panel 510 allows a user to input information that will be used by a trunk group selection search engine to identify trunk groups meeting the user's criteria. That criteria may include a geographical region 512, a group list 514, a switch 522 that may be selected from a list using add 524 and remove 526 buttons to form a user selected switch list 528, CCNA criteria, 532 that may be selected using add 534 and remove 536 buttons to form a user selected list 538 of CCNA information, state criteria 542 that may be selected using add 544 and remove 546 buttons to form a user selected list 548 of states, a traffic use 552, a traffic class 562.

Referring now to FIG. 6, a graphical user interface 200 of exemplary software in accordance with the present invention is illustrated after the show trunk history button 225 has been selected. The trunk group display panel 210 has now been replaced by a history panel 610 that provides an historical description of the operation of the selected trunk group. The history display panel 610 provides a user with information regarding the historical utilization and volume of traffic of the selected trunk group. Historical information displayed in display panel 610 may show usage on a yearly basis, that identifies the month of a given year with the highest usage and the corresponding usage. Display panel 610 may also show a weekly breakdown for the current month.

Referring now to FIG. 7 the graphical user interface 200 of the exemplary software now displays a report of trunk groups for printing. This report contains the information selected in panel 510 illustrated in FIG. 5 formatted for printing. The report illustrated in graphical user interface 200 includes a first panel 710, a sub-panel 750, that permits a user to look up information about equipment CLLI, which refers to Common Language Location Identification.

The present invention of a system and method for managing telecommunication trunk groups may be implemented using software as described herein. It should be realized that a variety of other software may implement the present invention using different configurations, different nomenclature, and different interfaces than those illustrated herein. Any programming language and data format may be used in accordance with the present invention.

What is claimed is:

1. A method for managing telecommunication trunk groups, a trunk group comprising media over which a plurality of trunks are established with hardware associated with the media, the method comprising:

receiving information regarding the configuration of telephony circuits comprising each trunk group to be managed;

receiving traffic information regarding the historical volume of traffic using the hardware associated with a trunk group;

displaying trunk groups;

displaying information regarding at least one trunk group's configuration and traffic information associated with the at least one trunk group;

receiving user input selecting a displayed trunk group;

receiving user input setting a grade of service for the selected trunk group; and calculating the number of trunks required for the selected trunk group to provide the set grade of service based upon the traffic information for the selected trunk group.

2. The method for managing telecommunication trunk groups of claim 1, further comprising:

determining the percentage utilization of each trunk group using the traffic information for the selected trunk group and the configuration information for the selected trunk group; and displaying the percentage utilization of the selected trunk group.

3. The method for managing telecommunication trunk groups of claim 2, further comprising:

receiving user input proposing configuration changes to the selected trunk group;

determining the percentage utilization of the selected trunk group that would result if the proposed configuration changes are made based upon the traffic information for the selected trunk group; and displaying the percentage utilization of the selected trunk group that would result if the proposed configuration changes are made.

4. The method for managing telecommunication trunk groups of claim 3, wherein receiving user input proposing configuration changes to the selected trunk group comprises receiving user input proposing the removal of trunks dedicated to the selected trunk group.

5. The method for managing telecommunication trunk groups of claim 4, wherein receiving user input proposing configuration changes to the selected trunk group comprises receiving user input proposing the addition of trunks dedicated to the selected trunk group.

6. The method for managing telecommunication trunk groups of claim 1, further comprising:

receiving user input establishing trunk group selection criteria; and displaying the trunk groups that meet the established trunk group selection criteria to a user.

7. The method for managing telecommunication trunk groups of claim 6, wherein receiving user input establishing trunk group selection criteria comprises receiving a minimum percentage utilization.

8. The method for managing telecommunication trunk groups of claim 6, wherein receiving user input establishing trunk group selection criteria comprises receiving a maximum percentage utilization.

9. The method for managing telecommunication trunk groups of claim 6, wherein receiving user input establishing trunk group selection criteria comprises receiving a range of percentage utilization.

10. The method for managing telecommunication trunk groups of claim 6, wherein receiving user input establishing trunk group selection comprises receiving information identifying the hardware associated with a trunk group.

11. The method for managing telecommunication trunk groups of claim 10, wherein receiving information identifying the hardware associated with a trunk group comprises receiving information identifying a telephony switch.

12. A method for managing telecommunication trunk groups, a trunk group comprising media over which a plurality of trunks are established with associated hardware, such as switches, the method comprising:

receiving information regarding the configuration of telephony circuits that use a trunk group;

receiving traffic information regarding the volume of traffic using the hardware associated with the trunks comprising a trunk group;

determining the percentage utilization of each trunk group using the traffic information and the configuration information for each trunk group;

placing trunk groups in user-groups;

receiving user input establishing trunk group selection criteria;

displaying the trunk groups that meet the established trunk group selection criteria to a user;

receiving user input selecting a displayed trunk group;

displaying the percentage utilization of the selected trunk group;

receiving input from a user setting a grade of service requirement for the selected trunk group;

calculating the number of trunks required for the selected trunk group to provide the set grade of service based upon the traffic information for the selected trunk group; and displaying the number of trunks required for the selected trunk group to provide the set grade of service.

13. The method for managing telecommunication trunk groups of claim 12, further comprising:

receiving user input proposing configuration changes to the selected trunk group;

determining the percentage utilization that would result if the proposed configuration changes to the selected trunk group are made based upon the traffic information for the selected trunk group; and displaying the percentage utilization that would result if the proposed configuration changes to the selected trunk group are made.

14. The method for managing telecommunication trunk groups of claim 13, wherein receiving user input proposing configuration changes to the selected trunk group comprises receiving user input proposing the removal of trunks from the selected trunk group.

15. The method for managing telecommunication trunk groups of claim 13, wherein receiving user input proposing configuration changes to the selected trunk group comprises receiving user input proposing the addition of trunks to the selected trunk group.

16. The method for managing telecommunication trunk groups of claim 13, wherein receiving user input proposing configuration changes to the selected trunk group comprises:

receiving user input proposing the removal of at least one trunk dedicated to the selected trunk group; and receiving user input proposing the addition of at least one trunk dedicated to the selected trunk group.

17. At least one computer-readable media containing embodied thereon computer-readable code for causing a computer to perform a method for managing telecommunication trunk groups, the method comprising:

receiving information regarding the configuration of telephony circuits comprising each trunk group to be managed;

receiving traffic information regarding the historical volume of traffic using the hardware associated with a trunk group;

displaying trunk groups;

displaying information regarding at least one trunk group's configuration and traffic information associated with the at least one trunk group;

receiving user input selecting a displayed trunk group;

receiving user input setting a grade of service for the selected trunk group; and calculating the number of trunks required for the selected trunk group to provide the set grade of service based upon the traffic information for the selected trunk group.

18. The at least one computer-readable media of claim 17, the method further comprising:

determining the percentage utilization of each trunk group using the traffic information for the selected trunk group and the configuration information for the selected trunk group; and displaying the percentage utilization of the selected trunk group.

19. The at least one computer-readable media of claim 18, the method further comprising:

receiving user input proposing configuration changes to the selected trunk group;

determining the percentage utilization of the selected trunk group that would result if the proposed configuration changes are made based upon the traffic information for the selected trunk group; and displaying the percentage utilization of the selected trunk group that would result if the proposed configuration changes are made.

20. The at least one computer-readable media of claim 19, the method further comprising:

receiving user input establishing trunk group selection criteria; and displaying the trunk groups that meet the established trunk group selection criteria to a user.

21. The at least one computer-readable media of claim 18, wherein receiving user input establishing trunk group selection criteria comprises receiving a minimum percentage utilization.

22. The at least one computer-readable media of claim 21, wherein receiving user input establishing trunk group selection criteria comprises receiving a maximum percentage utilization.

23. The at least one computer-readable media of claim 18, wherein receiving user input establishing trunk group selection criteria comprises receiving a range of percentage utilization.

24. The at least one computer-readable media of claim 18, wherein receiving user input establishing trunk group selection criteria comprises receiving information identifying the hardware associated with a trunk group.

25. The at least one computer-readable media of claim 24, wherein receiving information identifying the hardware associated with a trunk group comprises receiving information identifying a telephony switch.

26. At least one computer-readable media containing embodied thereon computer-readable code for causing a computer to perform a method for managing telecommunication trunk groups, the method comprising:

receiving information regarding the configuration of telephony circuits that use a trunk group;

receiving traffic information regarding the volume of traffic using the hardware associated with the trunks comprising a trunk group;

determining the percentage utilization of each trunk group using the traffic information and the configuration information for each trunk group;

placing trunk groups in user-groups;

receiving user input establishing trunk group selection criteria;

displaying the trunk groups that meet the established trunk group selection criteria to a user;

receiving user input selecting a displayed trunk group;

displaying the percentage utilization of the selected trunk group;

receiving input from a user setting a grade of service requirement for the selected trunk group;

calculating the number of trunks required for the selected trunk group to provide the set grade of service based upon the traffic information for the selected trunk group; and displaying the number of trunks required for the selected trunk group to provide the set grade of service.

27. The at least one computer-readable media of claim 26, the method further comprising:

receiving user input proposing configuration changes to the selected trunk group;

determining the percentage utilization that would result if the proposed configuration changes to the selected trunk group are made based upon the traffic information for the selected trunk group; and displaying the percentage utilization that would result if the proposed configuration changes to the selected trunk group are made.

28. The at least one computer-readable media of claim 27, wherein receiving user input proposing configuration changes to the selected trunk group comprises receiving user input proposing the removal of trunks from the selected trunk group.

29. The at least one computer-readable media of claim 27, wherein receiving user input proposing configuration changes to the selected trunk group comprises receiving user input proposing the addition of trunks to the selected trunk group.

30. The at least one computer-readable media of claim 27, wherein receiving user input proposing configuration changes to the selected trunk group comprises:

receiving user input proposing the removal of trunk(s) dedicated to the selected trunk group; and receiving user input proposing the addition of trunk(s) dedicated to the selected trunk group.

* * * * *